(12) United States Patent
Choi

(10) Patent No.: US 8,520,639 B2
(45) Date of Patent: Aug. 27, 2013

(54) APPARATUS AND METHOD FOR PERFORMING HANDOVER IN ADVANCED MOBILE COMMUNICATION SYSTEM

(75) Inventor: Sung Gu Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 342 days.

(21) Appl. No.: 12/837,858

(22) Filed: Jul. 16, 2010

(65) Prior Publication Data

US 2011/0142008 A1 Jun. 16, 2011

(30) Foreign Application Priority Data

Dec. 15, 2009 (KR) ........................ 10-2009-0124589

(51) Int. Cl.
*H04J 3/00* (2006.01)
(52) U.S. Cl.
USPC .......................................... 370/332; 455/550
(58) Field of Classification Search
USPC ......... 370/254, 331–339, 469–473, 401–427; 455/550.1
See application file for complete search history.

(56) References Cited

U.S. PATENT DOCUMENTS

| | | | |
|---|---|---|---|
| 7,006,828 B1 | 2/2006 | Czaja et al. | |
| 7,643,830 B2 | 1/2010 | Catovic et al. | |
| 8,144,663 B2 * | 3/2012 | Petrovic et al. | 370/331 |
| 2004/0121771 A1 | 6/2004 | Song et al. | |
| 2004/0192375 A1 * | 9/2004 | Cho et al. | 455/550.1 |

FOREIGN PATENT DOCUMENTS

| | | |
|---|---|---|
| KR | 1020040056480 | 7/2004 |
| KR | 1020040056980 | 7/2004 |
| KR | 1020060062950 | 6/2006 |
| KR | 10-2009-0033475 | 4/2009 |

* cited by examiner

*Primary Examiner* — Ricky Ngo
*Assistant Examiner* — Iqbal Zaidi
(74) *Attorney, Agent, or Firm* — Nelson Mullins Riley & Scarborough LLP

(57) ABSTRACT

An apparatus for performing handover in an advanced mobile communication system which provides traffic service to a mobile terminal in a multiple cell environment, the apparatus includes: a handover control unit for recognizing cell determination parameters based on terminal status information collected from the mobile terminal and/or information on traffic provided to the mobile terminal; a handover determination unit for assigning predetermined weights to each of the cell determination parameters when handover is required; a cell selection control unit for determining importance of each of the cell determination parameters based on the assigned weights and generating cell selection information for selecting a candidate cell for handover, which is the most optimal for the cell determination parameters in the order of the importance, among cells adjacent to a serving cell to which the mobile terminal belongs; and a handover execution unit for executing the handover based on the cell selection information.

15 Claims, 4 Drawing Sheets

APPARATUS AND METHOD FOR PERFORMING HANDOVER IN ADVANCED MOBILE COMMUNICATION SYSTEM

CROSS-REFERENCE(S) TO RELATED APPLICATION(S)

The present invention claims priority of Korean Patent Application No. 10-2009-0124589, filed on Dec. 15, 2009, which is incorporated herein by reference.

FIELD OF THE INVENTION

The present invention relates to a technology for processing handover; and, more particularly, to an apparatus and method for performing handover in an advanced mobile communication system which are capable of reducing unnecessary handover in a multiple cell environment.

BACKGROUND OF THE INVENTION

An advanced mobile communication system (beyond the third generation (B3G) or the fourth generation (4G)) as a new system different from the third generation (3G) mobile communication system provides various multimedia services with high transmission rate.

Mobile communication environment of the advanced mobile communication system has a configuration of a nested wireless network, i.e., a network configuration of multiple cell environment, where multiple picocells within one microcell are gathered and form a hotspot region to have a nested service region.

In such an advanced mobile communication system working in the multiple cell environment, a multimedia communication with an ultrahigh speed is required even while a mobile terminal is moving at high speed, same as while the mobile terminal stops. Further, a broadband (20 MHz bandwidth in the advanced mobile communication system) is required in order to accommodate the multimedia services of ultrahigh speed, and a cell radius (radius of picocell is estimated to be around 30 m, radius of megacell is estimated to be around 10 m) needs to become much smaller in order to efficiently use the frequency.

Due to a smaller cell radius and a faster mobility of the mobile terminal, handover frequently occurs and load of a network increases, thereby requiring even faster handover processing.

In other words, the handover occurs once every few minutes in the conventional 3G mobile communication system, but, in the advanced mobile communication system, the occurrence number of the handover increases and intervals of the occurrence time decreases, so that the handover occurs once every few seconds or every several tens of seconds.

In the advanced mobile communication system where such frequent handover has to be processed, unnecessary handover may occur, causing overhead in signaling. This results in degradation in performance of the system.

Further, when such frequent handover is not rapidly processed, the performance of the system also declines, and thus a study on the handover processing considering a faster mobility of the mobile terminal is required.

SUMMARY OF THE INVENTION

In view of the above, the present invention provides an apparatus and method for performing handover in an advanced mobile communication system which are capable of efficiently processing multimedia traffic in a multiple cell environment by selecting an optimal cell in comprehensive consideration of traffic characteristics, a moving speed of a mobile terminal, adjacent cell state and the like.

In accordance with a first aspect of the present invention, there is provided an apparatus for performing handover in an advanced mobile communication system which provides traffic service to a mobile terminal in a multiple cell environment, the apparatus including:

a handover control unit for recognizing cell determination parameters based on terminal status information collected from the mobile terminal in the multiple cell environment and/or information on traffic provided to the mobile terminal;

a handover determination unit for assigning predetermined weights to each of the cell determination parameters when handover is required;

a cell selection control unit for determining importance of each of the cell determination parameters based on the assigned weights and generating cell selection information for selecting a candidate cell for handover, which is the most optimal for the cell determination parameters in the order of the importance, among cells adjacent to a serving cell to which the mobile terminal belongs; and a handover execution unit for executing the handover based on the cell selection information.

In accordance with a second aspect of the present invention, there is provided a method for performing handover in an advanced mobile communication system which provides traffic service to a mobile terminal in a multiple cell environment, the method including:

searching for an adjacent cell candidate group among cells adjacent to a serving cell to which a mobile terminal belongs when handover of the mobile terminal is required;

recognizing cell determination parameters based on terminal status information collected from the mobile terminal and information on traffic provided to the mobile terminal;

assigning weights to each of the cell determination parameters to determine importance of each of the cell determination parameters;

selecting one candidate cell for handover in the adjacent cell candidate group based on the importance of the cell determination parameters; and performing handover of the mobile terminal to the selected candidate cell.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings which form a part hereof.

Figure 1:
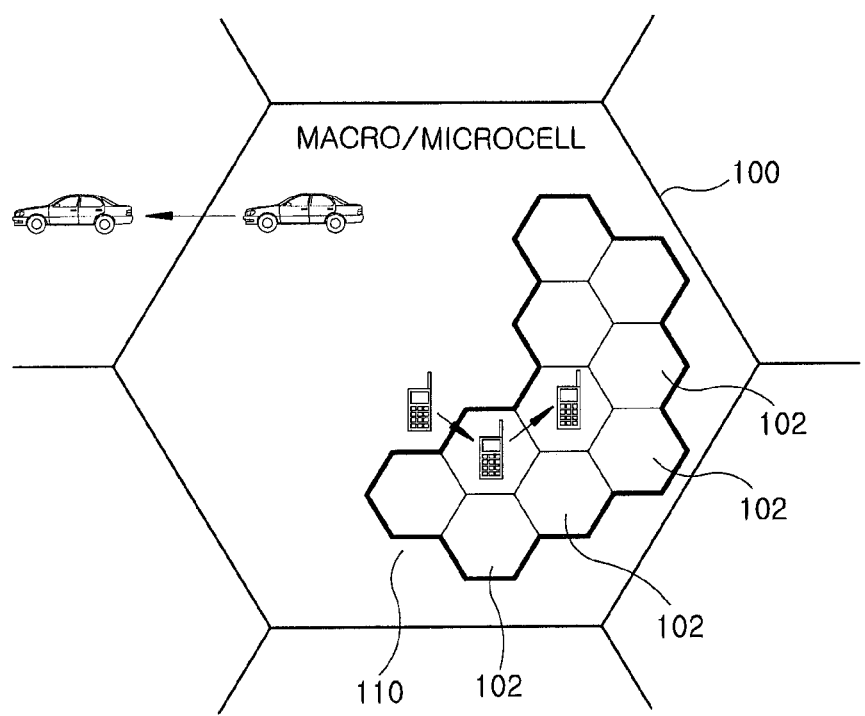
FIG. 1 shows a view for describing a mobile communication environment to which the present invention is applied.

FIG. 1 shows a view for describing a mobile communication environment to which an advanced mobile communication system of the present invention is applied. The mobile communication environment has a configuration of a nested wireless network where multiple picocells 102 are gathered and form a hotspot region (hereinafter, also called a hotspot cell) 110 to have a nested service region. In one example of the nested network, the macro/microcell 100 served in an existing mobile communication network provides a medium/low data rate to a terminal moving at a medium/high speed in a wide service region, while the picocells 102 served in the hotspot cell 110 provides a high data rate to a terminal stopped or moving at a medium/low speed.

In such a nested wireless network environment for 3rd Generation Partnership Project (3GPP), service regions of wireless networks having different attributes and interworking are hierarchically nested. Accordingly, a service subscriber can flexibly access an optimal network by selectively using the macro/microcell 100 or the hotspot cell 110 depending on his/her location, electromagnetic wave environment, service characteristics, moving pattern of a subscriber's terminal, data transmission type, and/or his/her preference.

Types of handover in the above-described wireless network environment will be described with reference to FIG. 2.

Figure 2:
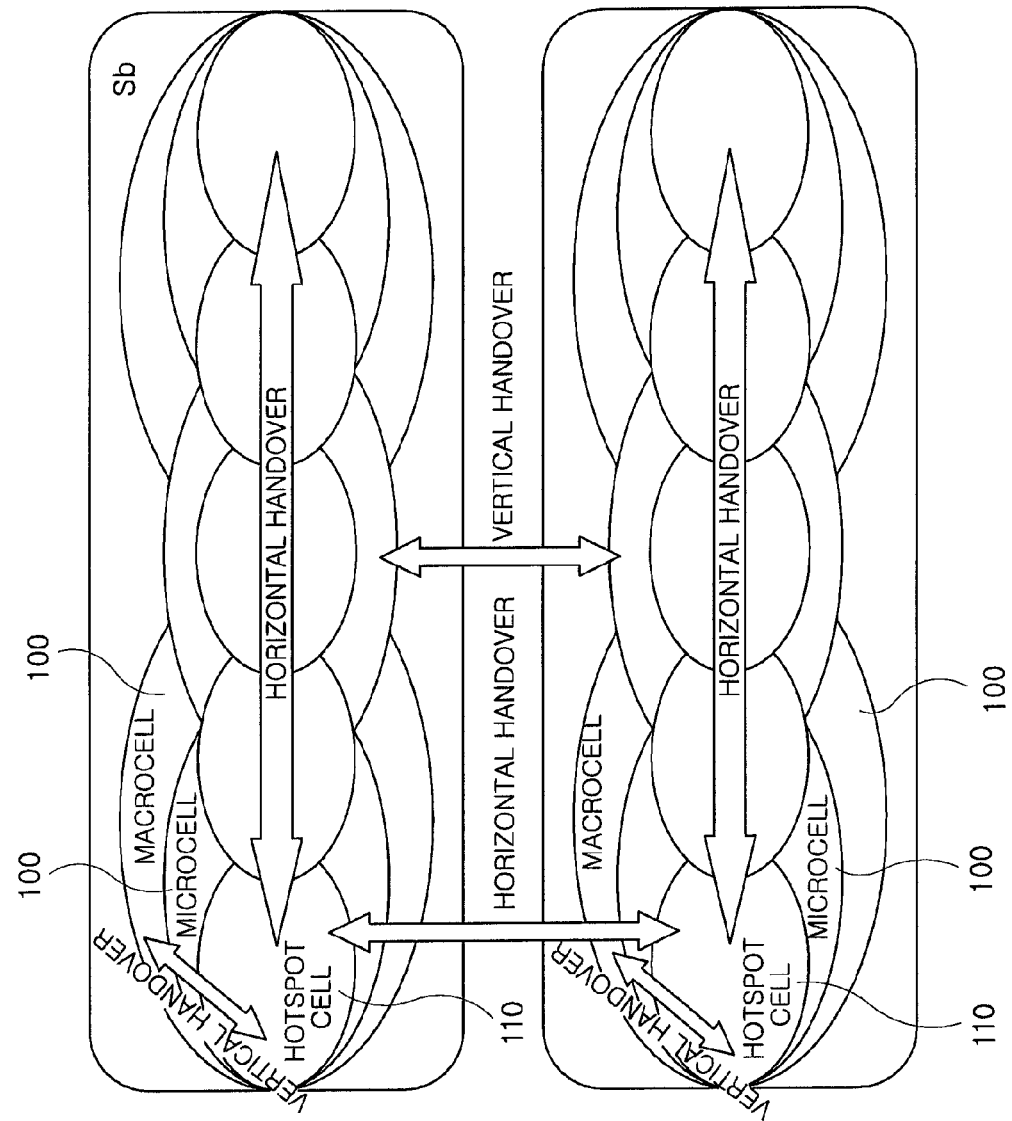
FIG. 2 shows a view for describing types of handover in a wireless network environment to which the present invention is applied.

FIG. 2 shows a view for describing types of handover in a wireless network environment to which the present invention is applied. The types of handover are largely divided into a horizontal handover and vertical handover. Here, the horizontal handover refers to a moving between cells having a similar cell size, or in same cell layer. The vertical handover refers to a moving between cells having a different cell layer.

The mobile communication environment to which the present invention is applied can provide a variety of services depending on service characteristics and/or a moving speed of a terminal and a subscriber. The vertical handover can be classified into an upward vertical handover and a downward vertical handover. The upward vertical handover is performed from the picocell 102 in the hotspot cell 110 to the macro/microcell 100, and the downward vertical handover is performed from the macro/microcell 100 to the picocell 102 in the hotspot cell 110. In the upward vertical handover, it is advantageous that the upward vertical handover is triggered only when a terminal strays from a hotspot coverage range. Because wireless resources are rare in 3GPP, i.e., in the macro/microcell 100 compared to the hotspot region 110 and therefore, it is advantageous for a network operator that services are provided in the picocell 102 within the hotspot cell 110. In addition, 3GPP cannot provide the same quality of service (QoS) as that provided in the picocell 102, and thus, a negotiation for downgrading of QoS is required.

In the downward vertical handover performed from the macro/microcell 100 to the picocell 102, it is preferable that the handover is attempted as soon as possible after a picocell signal is detected, in order to save wireless resources in the macro/microcell 100. In this case, if a user's terminal is provided as a negotiation result with a lower QoS than that demanded by the user due to a lack of wireless resources in the macro/microcell 100, recovery of QoS can be attempted while the handover to the poicocell 102 is performed.

Figure 3:
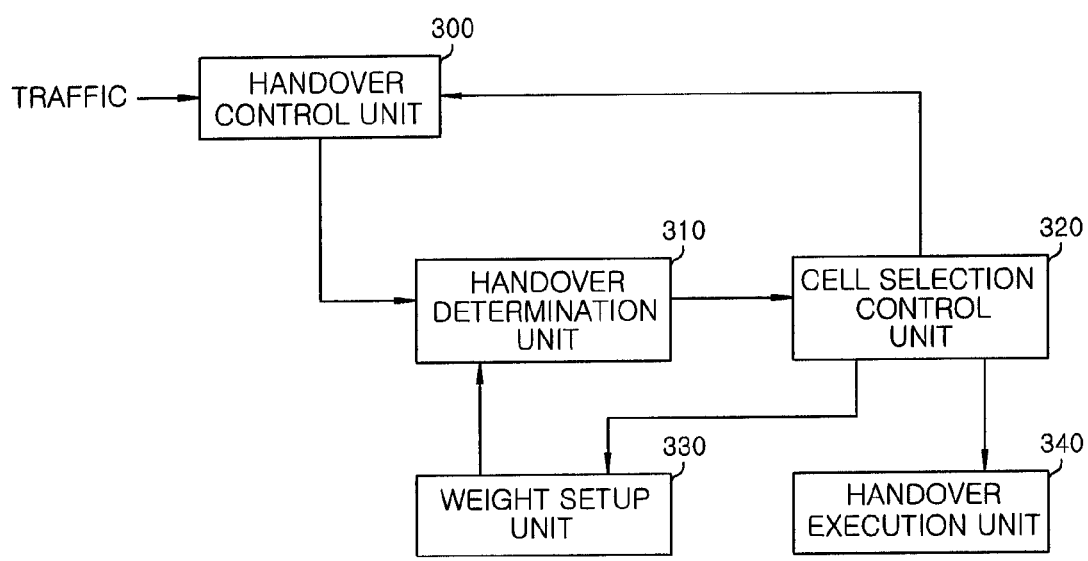
FIG. 3 is a block diagram illustrating an apparatus for processing handover in an advanced mobile communication system which manages a multiple cell environment in accordance with an embodiment of the present invention.

FIG. 3 is a block diagram illustrating an apparatus for processing handover in an advanced mobile communication system which manages a multiple cell environment in accordance with an embodiment of the present invention.

Referring to FIG. 3, the apparatus for processing handover which may be included in base station, mobile switching center (MSC) or the like in an advanced mobile communication system includes a handover control unit 300, a handover determination unit 310, a cell selection control unit 320, weight setup unit 330, and a handover execution unit 340.

The handover control unit 300, when receiving a request to process traffic from a mobile terminal within multiple cells, recognizes cell determination parameters which are used to select an optimal cell for handover. The cell determination parameters includes characteristics of the traffic, a preference of a user using the mobile terminal, a status of a cell accessed by the traffic, a power status of the mobile terminal, a moving speed of the mobile terminal, service characteristics, a service type, and importance and urgency of the traffic. Among the cell determination parameters, the preference of the user, the power status of the mobile terminal, and the moving speed of the mobile terminal are recognized based on terminal status information collected from the mobile terminal that has sent the request to process traffic. Further, the characteristics of the traffic, the status of the cell accessed by the traffic, the service characteristics, the service type, and the importance and urgency of the traffic are recognized based on traffic information provided to the mobile terminal. The cell determination parameters are provided to the handover determination unit 310.

The handover determination unit 310 assigns different weights to each of the cell determination parameters and provides the cell selection control unit 320 with information on the cell determination parameters given the weights. The weight is a predetermined value in the advanced mobile communication system and may be altered by a request of a manager.

The weight setup unit 330 provides an interface for adjusting the weights assigned in the handover determination unit 310. The weights assigned to the cell determination parameters can be altered through the interface by the weight setup unit 330 when the cell selection control unit 320 requests. For example, a weight assigned to the urgency of the traffic can increase by a request to increase the corresponding weight.

When handover is required by a received signal from the mobile terminal, the cell selection control unit 320 searches for an adjacent cell candidate group among cells adjacent to a serving cell to which the mobile terminal belongs, in consideration of resource state of each adjacent cell. Further, the cell selection control unit 320 determines importance of each of the cell determination parameters given weights, and checks whether a cell, which is the most optimal for a cell determination parameter determined to have the highest importance, exists in the adjacent cell candidate group. If the most optimal cell exists in the adjacent cell candidate group, the cell selection control unit 320 generates cell selection information for selecting the optimal cell to provide the handover execution unit 340 with the cell selection information. If the most optimal cell does not exist in the adjacent cell candidate group, the cell selection control unit 320 checks whether a suboptimal cell which meets a QoS exists in the adjacent cell candidate group. If the suboptimal cell exists, the cell selection control unit 320 requests the handover control unit 300 to adjust cell determination parameters so that the suboptimal cell can be selected. Alternatively, the cell selection control unit 320 may alter the weights of the cell determination parameters assigned in the handover determination unit 310 by controlling the weight setup unit 330.

On the contrary, if the suboptimal cell which meets the QoS does not exist in the adjacent cell candidate group, i.e., resource status of adjacent cells does not meet the QoS, the cell selection control unit 320 requests that a processing of traffic be stopped.

As described above, the cell selection control unit 320 generates the cell selection information based on a cell determination parameter given the highest weight to provide it to the handover execution unit 340. That is, the cell selection control unit 320 determines importance of each of the cell determination parameters based on weights which are assigned to cell determination parameters, and generates the cell selection information according to the determined importance to provide it to the handover execution unit 340.

As an example, it is assumed that traffic characteristic is given the highest weight. In this case, if the traffic characteristic is a real-time traffic service, cell selection information for selecting a hotspot cell in an multiple cell environment is provided to the handover execution unit 340. If the traffic characteristic is a non-real-time traffic service, cell selection information for selecting a macrocell or a microcell in the multiple cell environment is provided to the handover execution unit 340. As another example, it is assumed that the moving speed of the mobile terminal is given the highest weight. In this case, if the moving speed of the mobile terminal is high, i.e., not less than a predetermined critical value, a cell selection information for selecting a macrocell or a microcell is provided to the handover execution unit 340, and if the moving speed of the mobile terminal is low, i.e., under the predetermined critical value, cell selection information for selecting a hotspot cell is provided to the handover execution unit 340.

The handover execution unit 340 selects, based on the cell selection information from the cell selection control unit 320, a corresponding cell and performs handover of the mobile terminal to the cell.

Hereinafter, a process that the apparatus for processing handover having the above-described configuration processes handover will be described with reference to FIG. 4.

Figure 4:
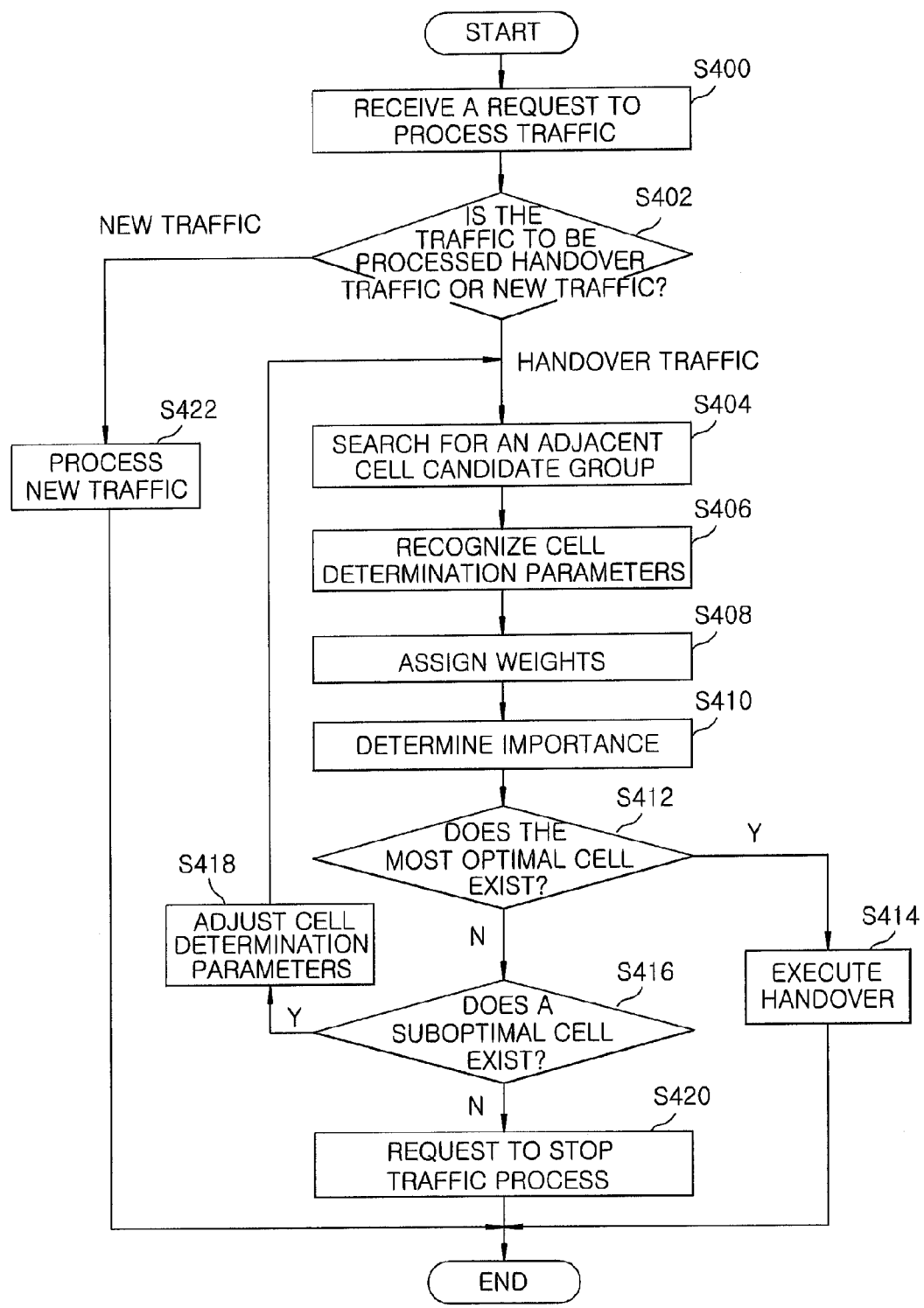
FIG. 4 is a flowchart illustrating a handover processing in the multiple cell environment in accordance with the embodiment of the present invention.

FIG. 4 is a flowchart illustrating a handover processing in the multiple cell environment in accordance with the embodiment of the present invention.

Referring to FIG. 4, when receiving a request to process traffic in step S400, the handover control unit 300 determines whether the traffic to be processed is handover traffic or new traffic in step S402.

When it is determined that the traffic is the handover traffic, the cell selection control unit 320 searches for an adjacent cell candidate group including at least one among cells adjacent to a serving cell to which the mobile terminal belongs in step S404. At this time, the cell selection control unit 320 searches for the adjacent cell candidate group in consideration of traffic characteristics, resource states of the adjacent cells, and information on the serving cell to which the mobile terminal belongs.

The handover control unit 300 recognizes, in step S406, cell determination parameters such as characteristics of the handover traffic, a preference of a user using the mobile terminal, a status of a cell accessed by the traffic, a power status of the mobile terminal, a moving speed of the mobile terminal, service characteristics, a service type, and importance and urgency of the traffic. The cell determination parameters are provided to the handover determination unit 310.

The handover determination unit 310 assigns weight to each of the cell determination parameters in step S408, and provides the cell determination parameters given weights to the cell selection control unit 320.

The cell selection control unit 320 determines importance of each of the cell determination parameters provided from the handover determination unit 310 in step S410. Then, in step S412, the cell selection control unit 320 checks whether a cell, which is the most optimal for a cell determination parameter determined to have the highest importance, exists in the adjacent cell candidate group.

If the most optimal cell exists in the adjacent cell candidate group as a result of the step S412, the cell selection control unit 320 generates cell selection information for selecting the most optimal cell to provide the cell selection information to the handover execution unit 340. Accordingly, the handover execution unit 340 executes handover to the most optimal cell based on the cell selection information in step S414.

If the most optimal cell does not exist in the adjacent cell candidate group as a result of the step S412, the cell selection control unit 320 determines whether a suboptimal cell capable of providing the QoS exists in consideration of the resource states of the adjacent cell candidate group in step S416.

If the suboptimal cell exists as a result of the step S416, the cell selection control unit 320 requests the handover control unit 300 to adjust the cell determination parameters in step S418 so that the suboptimal cell can be selected. Also, the cell selection control unit 320 may request the weight setup unit 330 to reset the weights. Accordingly, the handover control unit 300 adjusts the cell determination parameters and provides them to the handover determination unit 310. The handover determination unit 310 assigns the weights reset by the weight setup unit 330 to the adjusted cell determination parameters to provide them to the cell selection control unit 320.

Thereafter, the process returns to step S404 and the cell selection control unit 320 searches the adjacent cell candidate group again in order to select a suboptimal cell.

If the suboptimal cell does not exist as a result of the step S416, the cell selection control unit 320 requests that the handover control unit 300 stop traffic process in step S420. Meanwhile, when it is determined that the traffic to be processed is new traffic in step S402, the new traffic is processed according to a new traffic process rule in step S422.

As described above, the present invention provides an improved system performance which guarantees a QoS by performing handover to a suboptimal cell guaranteeing the QoS, when an optimal cell does not exist, by adjusting cell determination parameters.

Further, the present invention improves a QoS in a multiple cell environment by selecting a cell in consideration of a user's preference, status of adjacent cells, traffic characteristics and the like based on a received signal and performing handover.

While the invention has been shown and described with respect to the embodiments, it will be understood by those skilled in the art that various changes and modification may be made without departing from the scope of the invention as defined in the following claims.

What is claimed is:

1. An apparatus for performing handover in an advanced mobile communication system which provides traffic service to a mobile terminal in a multiple cell environment, the apparatus comprising:

a handover control unit for recognizing cell determination parameters based on terminal status information collected from the mobile terminal in the multiple cell environment and/or information on traffic provided to the mobile terminal;

a handover determination unit for assigning predetermined weights to each of the cell determination parameters when handover is required;

a cell selection control unit for determining importance of each of the cell determination parameters based on the assigned weights and generating cell selection information for selecting a candidate cell for handover, which is the most optimal for the cell determination parameters in the order of the importance, among cells adjacent to a serving cell to which the mobile terminal belongs; and a handover execution unit for executing the handover based on the cell selection information, wherein said cell selection control unit is configured to:

check whether the candidate cell for handover, which is the most optimal for the cell determination parameters in the order of the importance, exists in an adjacent cell candidate group;

check, when the most optimal candidate cell does not exist, whether a suboptimal cell which meets a quality of service exists in the adjacent cell candidate group in consideration of resource states of the adjacent cell candidate group; and adjust, when the suboptimal cell which meets the quality of service exists, the cell determination parameters and search for an adjacent cell candidate group to select the suboptimal cell.

2. The apparatus of claim 1, wherein the cell selection control unit checks whether the candidate cell for handover, which is the most optimal for the cell determination parameters in the order of the importance, exists in the adjacent cells, and generates the cell selection information of the most optimal cell.

3. The apparatus of claim 1, wherein the cell selection control unit, when the candidate cell for handover, which is the most optimal for the cell determination parameters in the order of the importance, does not exist in the adjacent cells, checks whether a suboptimal cell which meets a quality of service exists in the adjacent cells to request the handover control unit to adjust the cell determination parameters.

4. The apparatus of claim 1, further comprising:

a weight setup unit for adjusting the predetermined weights assigned to each of the cell determination parameters.

5. The apparatus of claim 4, wherein the cell selection control unit, when the candidate cell for handover, which is the most optimal for the cell determination parameters in the order of the importance, does not exist in the adjacent cells, requests the weight setup unit to reset the weights assigned to each of the cell determination parameters.

6. The apparatus of claim 1, wherein the cell determination parameters includes at least one of characteristics of the traffic, a preference of a user using the mobile terminal, a status of a cell accessed by the traffic, a power status of the mobile terminal, a moving speed of the mobile terminal, service characteristics, a service type, and importance and urgency of the traffic.

7. The apparatus of claim 1, wherein the cell selection control unit generates the cell selection information for selecting a hotspot cell among the adjacent cells when the traffic provided to the mobile terminal is a real-time traffic, and selecting a macro/microcell among the adjacent cells when the traffic is a non-real-time traffic.

8. The apparatus of claim 1, wherein the cell selection control unit generates the cell selection information for selecting a macro/microcell among the adjacent cells when a moving speed of the mobile terminal is not less than a predetermined critical value, and selecting a hotspot cell among the adjacent cells when the moving speed is under the predetermined critical value.

9. A method for performing handover in an advanced mobile communication system which provides traffic service to a mobile terminal in a multiple cell environment, the method comprising:

searching for an adjacent cell candidate group among cells adjacent to a serving cell to which a mobile terminal belongs when handover of the mobile terminal is required;

recognizing cell determination parameters based on terminal status information collected from the mobile terminal and information on traffic provided to the mobile terminal;

assigning weights to each of the cell determination parameters to determine importance of each of the cell determination parameters;

selecting one candidate cell for handover in the adjacent cell candidate group based on the importance of the cell determination parameters; and performing handover of the mobile terminal to the selected candidate cell, wherein said selecting one cell in the adjacent cell candidate group includes:

checking whether a candidate cell for handover, which is the most optimal for the cell determination parameters in the order of the importance, exists in the adjacent cell candidate group;

checking, when the most optimal candidate cell does not exist, whether a suboptimal cell which meets a quality of service exists in the adjacent cell candidate group in consideration of resource states of the adjacent cell candidate group; and adjusting, when the suboptimal cell which meets the quality of service exists, the cell determination parameters and returning to said searching for an adjacent cell candidate group to select the suboptimal cell.

10. The method of claim 9, wherein the adjacent cell candidate group is searched in consideration of characteristics of the traffic provided to the mobile terminal, resource states of the adjacent cells, and information on the serving cell to which the mobile terminal belongs.

11. The method of claim 9, wherein said selecting one cell in the adjacent cell candidate group further includes:

resetting, when the suboptimal cell which meets the quality of service exists, weights assigned to each of the cell determination parameters.

12. The method of claim 10, further comprising:

requesting, when the suboptimal cell which meets the quality of service does not exist, to stop a process of the traffic.

13. The method of claim 9, wherein when a cell determination parameter having the highest importance is a traffic characteristic, a hotspot cell in the multiple cell environment is selected if a characteristic of the traffic provided to the mobile terminal is a real-time, and a macro/microcell in the multiple cell environment is selected if the characteristic of the traffic is a non-real-time.

14. The method of claim 9, wherein when a cell determination parameter having the highest importance is a moving speed, a macro/microcell in the multiple cell environment is selected if a moving speed of the mobile terminal is not less than a predetermined critical value, and a hotspot cell in the multiple cell environment is selected if the moving speed of the mobile terminal is under the predetermined critical value.

15. The method of claim 9, wherein the cell determination parameters includes at least one of characteristics of the traffic, a preference of a user using the mobile terminal, a status of a cell accessed by the traffic, a power status of the mobile terminal, a moving speed of the mobile terminal, service characteristics, a service type, and importance and urgency of the traffic.

* * * * *